US011446601B2

(12) United States Patent
Sundaram et al.

(10) Patent No.: US 11,446,601 B2
(45) Date of Patent: Sep. 20, 2022

(54) CO2 CAPTURE FROM DILUTE SOURCES

(71) Applicant: ExxonMobil Technology and Engineering Company, Annandale, NJ (US)

(72) Inventors: Narasimhan Sundaram, Annandale, NJ (US); Patrick P. McCall, Matawan, NJ (US); Brendon L. Keinath, Houston, TX (US); Ananda K. Nagavarapu, Houston, TX (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 260 days.

(21) Appl. No.: 16/730,205

(22) Filed: Dec. 30, 2019

(65) Prior Publication Data
US 2020/0206673 A1    Jul. 2, 2020

Related U.S. Application Data

(60) Provisional application No. 62/787,512, filed on Jan. 2, 2019.

(51) Int. Cl.
*B01D 53/04*    (2006.01)
*B01D 53/08*    (2006.01)

(52) U.S. Cl.
CPC ..... *B01D 53/0431* (2013.01); *B01D 53/0462* (2013.01); *B01D 53/08* (2013.01);
(Continued)

(58) Field of Classification Search
CPC ............... B01D 53/04; B01D 53/0431; B01D 53/0462; B01D 53/08; B01D 2257/504; B01D 2259/40086; B01D 2253/204
See application file for complete search history.

(56) References Cited

U.S. PATENT DOCUMENTS

| | | | | |
|---|---|---|---|---|
| 2,739,670 A | * | 3/1956 | Miller | B01D 53/06 95/143 |
| 4,541,851 A | * | 9/1985 | Bosquain | B01D 53/0438 96/126 |

(Continued)

OTHER PUBLICATIONS

Boutte (The Napoleon configuration, 2022, Forum Geometricorum, vol. 2, pp. 39-46,) (Year: 2002).*

(Continued)

*Primary Examiner* — Youngsul Jeong
(74) *Attorney, Agent, or Firm* — Liza Negron

(57) ABSTRACT

Systems and methods are provided for separation of $CO_2$ from dilute source streams. The systems and methods for the separation can include use of contactors that correspond radial flow adsorbent modules that can allow for efficient contact of $CO_2$-containing gas with adsorbent beds while also facilitating use of heat transfer fluids in the vicinity of the adsorbent beds to reduce or minimize temperature variations. In particular, the radial flow adsorbent beds can be alternated with regions of axial flow heat transfer conduits to provide thermal management. The radial flow structure for the adsorbent beds combined with axial flow conduits for heat transfer fluids can allow for sufficient temperature control to either a) reduce or minimize temperature variations within the adsorbent beds or b) facilitate performing the separation using temperature as a swing variable for controlling the working capacity of the adsorbent.

5 Claims, 7 Drawing Sheets

(52) U.S. Cl.
CPC .................. *B01D 2253/204* (2013.01); *B01D 2257/504* (2013.01); *B01D 2259/40086* (2013.01)

(56) References Cited

U.S. PATENT DOCUMENTS

| | | | | |
|---|---|---|---|---|
| 5,593,475 | A * | 1/1997 | Minh | B01D 53/0462 96/132 |
| 5,618,506 | A * | 4/1997 | Suzuki | B01D 53/1493 423/228 |
| 5,728,198 | A * | 3/1998 | Acharya | B01D 53/02 95/114 |
| 7,094,275 | B2 | 8/2006 | Keefer et al. | |
| 8,268,043 | B2 | 9/2012 | Celik et al. | |
| 8,529,664 | B2 * | 9/2013 | Deckman | B01D 53/0423 95/96 |
| 9,120,049 | B2 | 9/2015 | Sundaram et al. | |
| 9,387,433 | B2 | 7/2016 | Lackner et al. | |
| 9,440,216 | B2 | 9/2016 | Ryan | |
| 9,446,343 | B2 | 9/2016 | Elliott et al. | |
| 9,527,747 | B2 | 12/2016 | Wright et al. | |
| 10,029,205 | B2 | 7/2018 | Sundaram et al. | |
| 2006/0169142 | A1 | 8/2006 | Rode et al. | |
| 2015/0360167 | A1 * | 12/2015 | Kalbassi | B01D 53/0431 96/108 |
| 2017/0203249 | A1 | 7/2017 | Gebald et al. | |
| 2017/0326494 | A1 * | 11/2017 | Gebald | F28F 1/126 |

OTHER PUBLICATIONS

Dekov (Napoleon Pointe, 2008, Journal of Computer-Generated Euclidean Geometry, No. 4 pp. 1-6) (Year: 2006).*

* cited by examiner

<TOP VIEW>

CO2 CAPTURE FROM DILUTE SOURCES

CROSS-REFERENCE TO RELATED APPLICATIONS

This application claims priority to U.S. Provisional Application Ser. No. 62/787,512 filed Jan. 2, 2019, which is herein incorporated by reference in its entirety.

FIELD OF THE INVENTION

Systems and methods are provided for capture of $CO_2$ from air or other dilute $CO_2$ sources.

BACKGROUND OF THE INVENTION

Capture of $CO_2$ for sequestration and/or for commercial use is an ongoing area of interest. In addition to capture of $CO_2$ at point sources, such as power plants, direct capture of $CO_2$ from air can also potentially be valuable. However, direct air capture of $CO_2$ can pose a variety of challenges.

One general difficulty in performing $CO_2$ capture is identifying suitable adsorbents and/or adsorbent structures for capture of the $CO_2$. This general difficulty is exacerbated when attempting to perform $CO_2$ capture from relatively dilute sources. Conventionally, layered bed structures (sometimes referred to as Napoleons) have been used when attempting to perform capture of $CO_2$ from low concentration sources. The goal of such layered bed structures can be to provide a high adsorbent capacity per unit volume, a high adsorbent utilization, or a combination thereof.

U.S. Pat. No. 8,268,043 describes a layered adsorbent contactor for use in a gas separator plant. The adsorbent bed design is described as providing low inlet void volumes, large bed frontal areas, and short bed depths. To achieve this, the adsorbent beds correspond to thin slabs, with gas being passed through the beds along the thin dimension. The resulting design is described as providing high adsorbent utilization.

U.S. Patent Application Publication 2017/0326494 describes a layered adsorbent structure corresponding to a plurality of layers of adsorbent particles that are held in place using semi-permeable fabric material. The adsorbent structure is described as being suitable for performing direct air capture of $CO_2$. The layers are arranged in a parallel manner with a defined narrow spacing between layers.

U.S. Pat. No. 10,029,205 describes a separation process performed using a two stage radially disposed adsorbent structure. The first adsorbent stage can include a metal organic framework adsorbent, while the second stage can include an adsorbent that is suitable for desorption of $CO_2$ by displacement with steam. The two stage adsorbent structure is described as being suitable for separation of $CO_2$ from streams having as low as 3 vol % $CO_2$.

SUMMARY OF THE INVENTION

In one aspect, a method for performing a separation on a dilute $CO_2$-containing feed is provided. The method can include passing a feed comprising a $CO_2$ content of 5000 vppm or less and a first $H_2O$ content into a radial flow adsorbent bed module comprising alternating adsorbent bed sections and heat transfer sections to form adsorbed $CO_2$ and a $CO_2$-depleted stream. The adsorbent beds can include a bed inner surface that faces a central axis of the radial flow adsorbent bed module and a bed outer surface at a larger radial distance from the central axis than the bed inner surface. The heat transfer sections can include a transfer section inner surface that faces a central axis of the radial flow adsorbent bed module and a transfer section outer surface at a larger radial distance from the central axis than the interior surface. The bed inner surfaces and the transfer section inner surfaces can define a central volume. The adsorbent beds can include one or more adsorbents having amine functional groups. The feed can be passed through the adsorbent beds under adsorption conditions at a first temperature and substantially along a radial direction of the radial flow adsorbent bed module. The method can further include desorbing at least a portion of the adsorbed $CO_2$ in the presence of a purge gas under desorption conditions to form a $CO_2$-enriched purge gas comprising a $CO_2$ content greater than the $CO_2$ content of the feed, the desorption conditions comprising at least one of a desorption temperature higher than the first temperature and an $H_2O$ content in the purge gas that is greater than the first $H_2O$ content. The purge gas can be passed through the adsorbent beds substantially along the radial direction of the radial flow adsorbent bed module. The method can further include passing, during the adsorbing and the desorbing, one or more heat transfer fluids through the heat transfer sections substantially along an axial direction of the radial flow adsorbent bed module.

In another aspect, a system for separating $CO_2$ from a dilute feed is provided. The system can include a plurality of radial flow adsorbent bed modules arranged in a Napoleon configuration. A radial flow adsorbent bed module in the Napoleon configuration can include a plurality of adsorbent bed sections, the adsorbent bed sections including a bed inner surface that faces a central axis of the radial flow adsorbent bed module and a bed outer surface at a larger radial distance from the central axis than the bed inner surface. The adsorbent beds can include one or more adsorbents having amine functional groups. A radial flow adsorbent bed module can further include a plurality of heat transfer sections, the plurality of heat transfer sections alternating with the plurality of adsorbent bed sections in the radial flow adsorbent bed module. The heat transfer sections can include one or more heat transfer fluid conduits oriented substantially along an axial direction of the radial flow adsorbent bed module. The heat transfer sections can include a transfer section inner surface that faces a central axis of the radial flow adsorbent bed module and a transfer section outer surface at a larger radial distance from the central axis than the interior surface. The bed inner surfaces and the transfer section inner surfaces can define a central volume, so that the radial flow adsorbent bed module corresponds to a substantially annular shape.

DETAILED DESCRIPTION OF THE EMBODIMENTS

Figure 1:
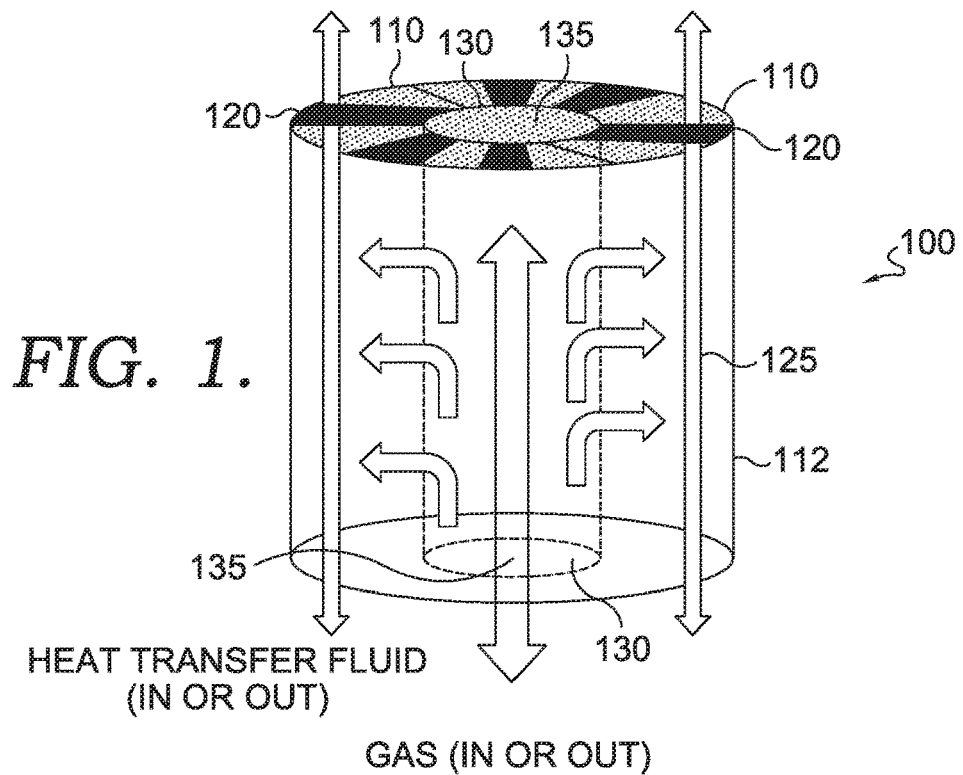
FIG. 1 shows an example of a radial flow adsorbent module.

All numerical values within the detailed description and the claims herein are modified by "about" or "approximately" the indicated value, and take into account experimental error and variations that would be expected by a person having ordinary skill in the art.

Overview

In various aspects, systems and methods are provided for separation of $CO_2$ from dilute source streams, such as source streams having a $CO_2$ content of 5000 vppm or less, or 3000 vppm or less, or 1000 vppm or less, or 500 vppm or less, such as down to 100 vppm of possibly still lower. The systems and methods for the separation can include use of contactors that correspond to one or more radial flow adsorbent modules that can allow for efficient contact of $CO_2$-containing gas with adsorbent beds while also facilitating use of heat transfer fluids in the vicinity of the adsorbent beds to reduce or minimize temperature variations. In particular, the radial flow adsorbent beds can be alternated with regions of axial flow heat transfer conduits to provide thermal management. The radial flow structure for the adsorbent beds combined with axial flow conduits for heat transfer fluids can allow for sufficient temperature control to either a) reduce or minimize temperature variations within the adsorbent beds or b) facilitate performing the separation using temperature as a swing variable for controlling the working capacity of the adsorbent.

Conventionally, thin layer adsorbent beds have been used when attempting to separate a dilute component from a feed. Thin layer adsorbent beds are traditionally believed to provide several advantages for performing dilute separations. Such traditional advantages include providing a large exposure area for the adsorbent relative to the adsorbent volume, and the ability to stack the layered beds to provide a high density of adsorbent relative to the volume of the contactor. However, maintaining desired control over temperature can pose problems. In particular, the distributed nature of the thin layer adsorbent beds can make it difficult to bring heat exchange fluids in close proximity to the adsorbent without also blocking large portions of the surface area from contact with the feed. U.S. Patent Application Publication 2017/0326494 describes use of metal sheets as secondary heat transfer surfaces in an effort to overcome this difficulty.

It has been discovered that a radial flow configuration for adsorbent beds can provide a variety of advantages when attempting to separate a dilute species (such as $CO_2$) from a feedstream. In particular, a radial flow contactor can be used where the adsorbent beds correspond to a series of adsorbent beds arranged around a central volume that contains a central axis of the annular structure. The adsorbent beds can be separated by heat transfer sections that include, for example, axial flow conduits for passing heat transfer fluids in proximity to the adsorbent beds. In some aspects, the axial flow conduits can correspond to conduits that are substantially aligned with the axial direction while in proximity to the adsorbent beds. In other aspects, the axial flow conduits can include one or more turns, so long as the net direction of flow of gas through the adsorbent beds can be roughly perpendicular to the net direction of flow of heat transfer fluid through the heat transfer sections. For example, the flow of gas through the adsorbent beds can be in a radial direction while the flow of heat transfer fluid through the heat transfer section can be in an axial direction. This type of configuration can allow for efficient heat transfer from the adsorbent beds and heat transfer fluid conduits while still providing a compact footprint for the adsorbent bed modules. The modules can also be readily scaled into larger assemblies. Optionally, the series of adsorbent beds can correspond to wedges, so that the width of the beds varies with distance from the central axis.

The use of alternating heat transfer sections in the radial flow adsorbent modules can allow heat transfer conduits to be placed in close proximity to the adsorbent beds in an efficient manner. This can allow for improved temperature control in comparison with a stacked bed structure. This can facilitate, for example, a separation to be performed using concentration gradients as the swing variable (i.e., displacement adsorption and/or displacement desorption) while having reduced or minimized temperature differences between the adsorption and desorption steps. This can provide improved working capacity for an adsorbent when using displacement desorption for a separation. In some aspects, both temperature and concentration gradients can be used as swing variables.

The ability to provide improved heat management and/or temperature control can be beneficial for improving the working capacity of the adsorbent. The nature of the heat management and/or temperature control can vary depending on the type of separation being performed. For example, during a separation based on displacement desorption, in some instances it can be beneficial to maintain the temperature of the adsorbent at a relatively constant value. Due to the dilute nature of the $CO_2$ in the feed for separation, the difference in $CO_2$ loading between the maximum during the adsorption step and the minimum during the desorption can be relatively modest. Thus, small changes in the temperature during adsorption and/or desorption can have a substantial impact on loading. By using a combination of radial flow adsorbent beds with adjacent axial flow heat transfer sections, temperature control can be improved. In aspects involving displacement desorption, the improved temperature control can optionally allow for temperature differences between the average bed temperature at the end of an adsorption step and the average bed temperature at the end of a desorption step of 5° C. or less, or 3° C. or less. In some aspects, providing improved thermal control can correspond to having a difference in average bed temperature in an adsorbent bed between the beginning of an adsorption step and the end of the adsorption step of 5° C. or less, or 3° C. or less. In some aspects, providing improved thermal control can correspond to having a difference in average bed temperature in an adsorbent bed between the beginning of a desorption step and the end of the desorption step of 5° C. or less, or 3° C. or less. The temperature in an adsorbent bed can be measured by any convenient method, such as by use of one or more thermocouples. The average bed temperature can be determined by measuring a) the temperature of the bed at the outer surface of the radial bed and b) at the inner surface of the radial bed (i.e., the surface facing the inside the annular volume of the radial module).

As another example, in aspects where the separation is based in part on temperature swing adsorption, providing improved thermal control can correspond to having a difference in average bed temperature in an adsorbent bed between the beginning of an adsorption step and the end of the adsorption step of 10° C. or less, or 5° C. or less. Additionally or alternately, providing improved thermal control can correspond to having a difference in average bed temperature in an adsorbent bed between the beginning of a desorption step and the end of the desorption step of 10° C. or less, or 5° C. or less. It is noted that temperature swing adsorption can in some situations involve a difference in temperature between the adsorption step and the desorption step of 50° C. to 100° C.

In some aspects, the ability to provide improved heat management can also be beneficial from a practical standpoint for performing $CO_2$ separation on a dilute feed using commercially relevant volumes. When separating $CO_2$ from a dilute feed, the energy consumed per mole of separated $CO_2$ can be relatively high compared to separation from a conventional (higher concentration) feed. Using a radial flow adsorbent module as described herein, a first portion of the adsorbent beds can be operated in adsorption mode, which can generate a heated gas stream due to the exotherm during adsorption. A portion of the heated gas stream from the bed operating under adsorption conditions can be used as the gas stream for a bed operating under desorption conditions. This can allow the heat generated during adsorption to be at least partially recovered in a corresponding desorption step, allowing for overall lower energy consumption.

Radial Flow Adsorbent Bed Modules

In various aspects, radial flow adsorbent bed modules can be used to facilitate separation of $CO_2$ from dilute feeds. The radial flow modules can be composed of annular modules of alternating adsorbent bed sections and heat transfer sections. If desired, a plurality of modules can then be arranged in an assembly, array, or other convenient grouping of multiple modules to facilitate larger scale separation. An example of a grouping of multiple modules can be a Napoleon, such as a Napoleon based on stacking of the radial flow adsorbent bed modules in rows and/or columns, or a Napoleon based on organizing the radial flow adsorbent bed modules into a series of stacked annular shapes around a common central annular volume (referred to herein as an annular Napoleon).

Figure 2:
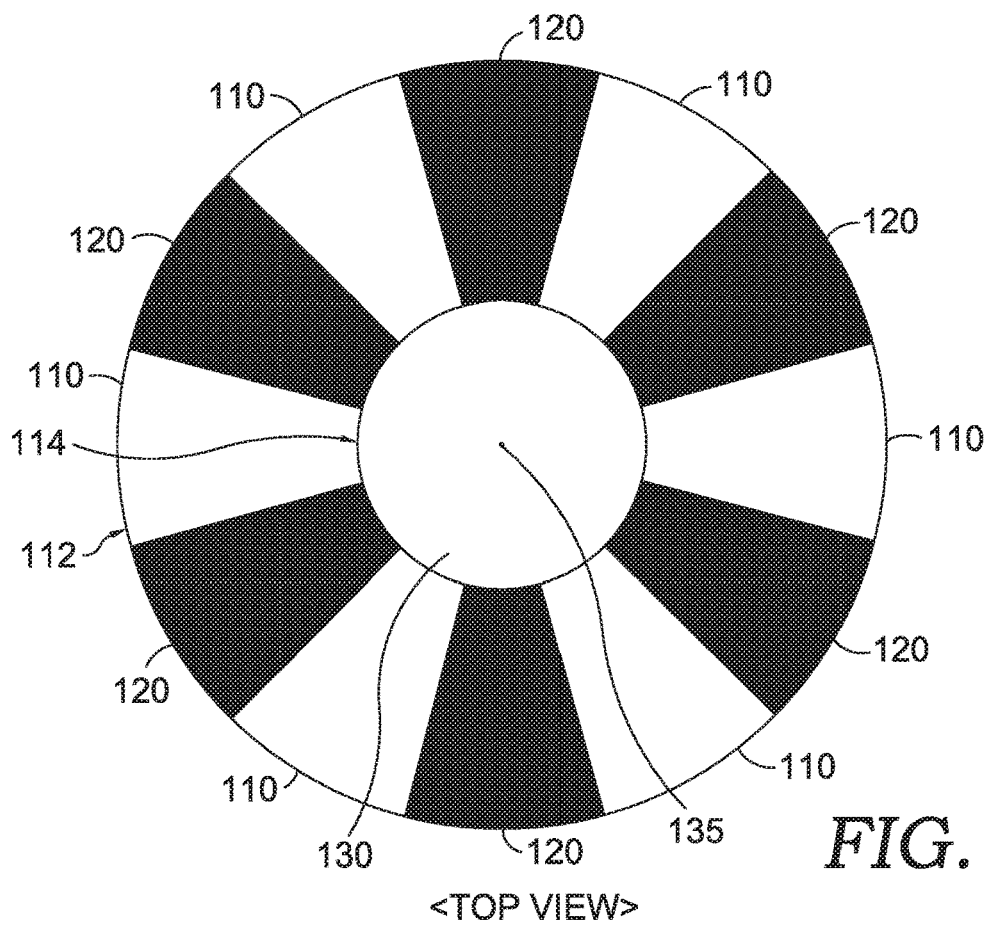
FIG. 2 shows a top view of a radial flow adsorbent module

FIG. 1 and FIG. 2 show a perspective view and a top view of an example of an annular module 100, respectively. In FIG. 1, the annular module includes alternating adsorbent bed sections 110 and heat transfer sections 120. The flow path through the adsorbent bed sections 110 corresponds to a radial flow path. One entry or exit location for gas is through outer surface 112 of an adsorbent bed section 110. The other entry or exit location is inner surface 114, which is adjacent to interior or central volume 130 of the annular shape. Central axis 135 is within the interior or central volume 130. In FIG. 2, outer surface 112 and inner surface 114 correspond to arcuate surfaces that have curvatures that substantially correspond to the curvature of the annular shape. In other aspects, outer edge 112 and/or inner edge 114 can have surfaces that differ from the curvature of the annular shape, such as flat surfaces. In FIG. 1 and FIG. 2, the adsorbent bed sections 110 are shown as having a wedge shape, where the width of the section increases with increasing distance from central axis 135. In other aspects, the adsorbent bed sections 110 can have any other convenient shape that is consistent with forming a roughly or approximately annular shape for the module 100, such as a rectangular cuboid shape or other parallelepiped shape.

The annular module 100 also includes heat transfer sections 120. Heat transfer sections 120 can include one or more conduits containing a heat transfer fluid, such as steam. In some aspects, the flow path for the heat transfer fluid conduits can be in a direction 125 that is substantially parallel to the central axis 135. In some aspects, the net flow direction of the heat transfer fluid can be substantially in an axial direction, but the flow path can include changes in flow direction while within the heat transfer section(s) 120. The heat transfer sections 120 can each include any convenient number of heat transfer fluid conduits. The heat transfer sections can optionally but preferably be impermeable to gas flow, so that any flow of gases between the exterior of annular module 100 and the central volume 130 is forced to pass either through an adsorbent bed section 110 or through an exit at the bottom or top of central volume 130.

Any convenient number of alternating adsorbent bed sections 110 and heat transfer sections 120 can be used to form an annular module 100. The example of an annular module 100 shown in FIG. 1 and FIG. 2 includes six adsorbent bed sections 110 and six heat transfer sections 120. The number of adsorbent bed sections 110 can be selected, for example, so that a sufficient number of heat transfer sections 120 are present to provide a desired level of temperature control. The inner radius and outer radius of annular module 100 can be selected based on any convenient consideration. For example, the inner radius and outer radius can be selected to provide a desired pressure drop, to provide a desired amount of adsorbent capacity, or a combination thereof. Examples of typical values for the inner radius can be 0.5 m-1.0 m; for the thickness of the adsorbent bed can be 1.0 m-2.0 m; and for the outer radius can be 1.5 m to 3.0 m. Examples of typical values for the length of the annular module can range from 5.0 m-15 m.

With reference to FIG. 1, it is to be understood that the flow path of the various feed and product streams disclosed herein, and the associated headers, valve manipulations, etc. would be readily recognizable to one of ordinary skill in the art. Accordingly, such mechanisms may not be shown in the figures.

Figure 3:
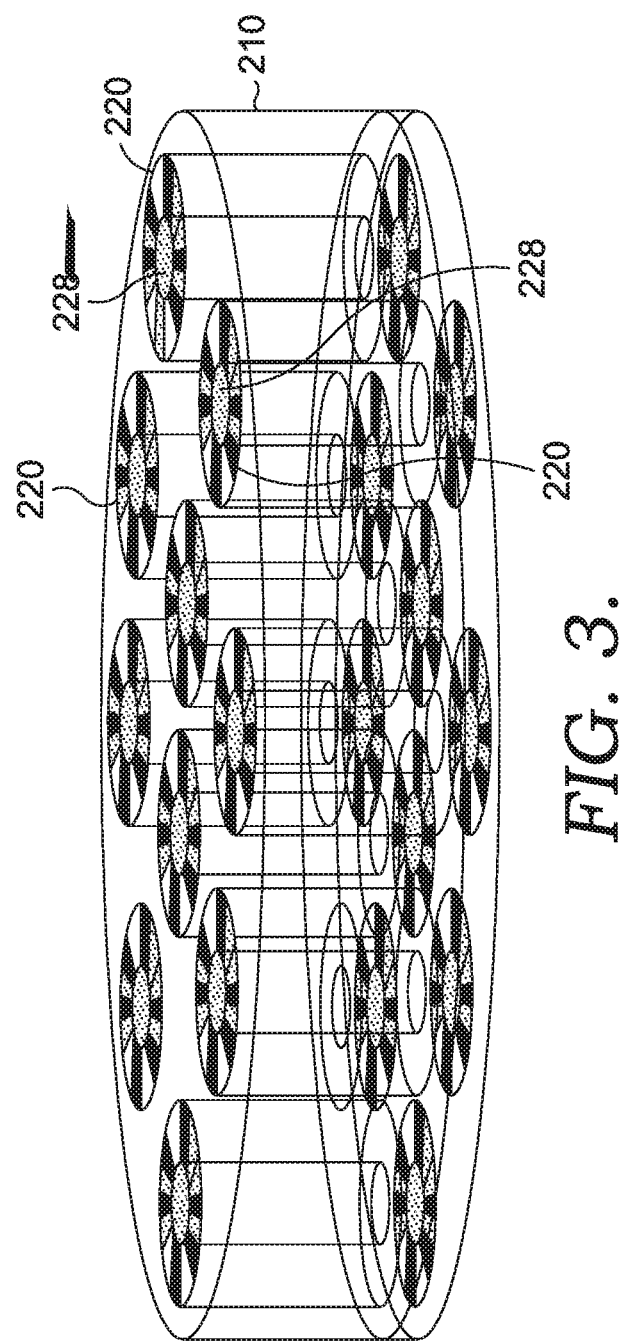
FIG. 3 shows an example of a configuration including a plurality of radial flow adsorbent modules.

For performing larger scale separations, a plurality of radial flow modules such as the module shown in FIG. 1 can be arranged to allow the plurality of modules to separate $CO_2$ from a common gas flow. FIG. 3 shows an example of arranging a plurality of radial flow modules 220 within a common volume 210 having a shape that roughly corresponds to a cylinder. It is noted that the common volume 210 is optional, as there may be no enclosure for the modules or the shape and/or size of the enclosure may not be related to the arrangement of the radial flow modules 220. In the configuration shown in FIG. 3, one example of operation could be to pass a dilute $CO_2$ flow into the common volume 210 during the adsorption step. The dilute $CO_2$ flow could pass radially through the adsorbent beds into the central volumes 228 of individual modules 220. The $CO_2$-depleted flow can then pass out of central volumes 228 into a manifold (not shown) or other piping. At the end of the adsorption step, the flow can then be changed in a desired manner. For example, for a separation based on temperature swing adsorption, the temperature in the radial flow modules 220 can be increased by increasing the temperature of the heat transfer liquid being passed through each module. A purge gas (optionally heated) can also be introduced, so that the purge gas becomes a $CO_2$-enriched stream as $CO_2$ is desorbed from the adsorbent beds. In some aspects, the purge gas can correspond to a co-current purge, so that the purge gas is passed into common volume 210, then through the adsorbent beds of radial flow modules 220, and then into central volumes 228 to exit from the plurality of modules. Alternatively, a counter-current purge could be used, so that the purge gas enters the plurality of radial flow modules via central volumes 228, and then is passed through the adsorbent beds of radial flow modules 220 to enter the common volume. At the end of the desorption step, the temperature of the radial flow modules can be reduced in part by reducing the temperature of the heat transfer fluid that is passed through the radial flow modules 220. It is noted that displacement desorption can follow a similar cycle, with steam being used as the purge gas. With regard to temperature control, the heat transfer fluids can be used to reduce or minimize temperature swings in the radial flow modules during adsorption and desorption, if desired.

Figure 4:
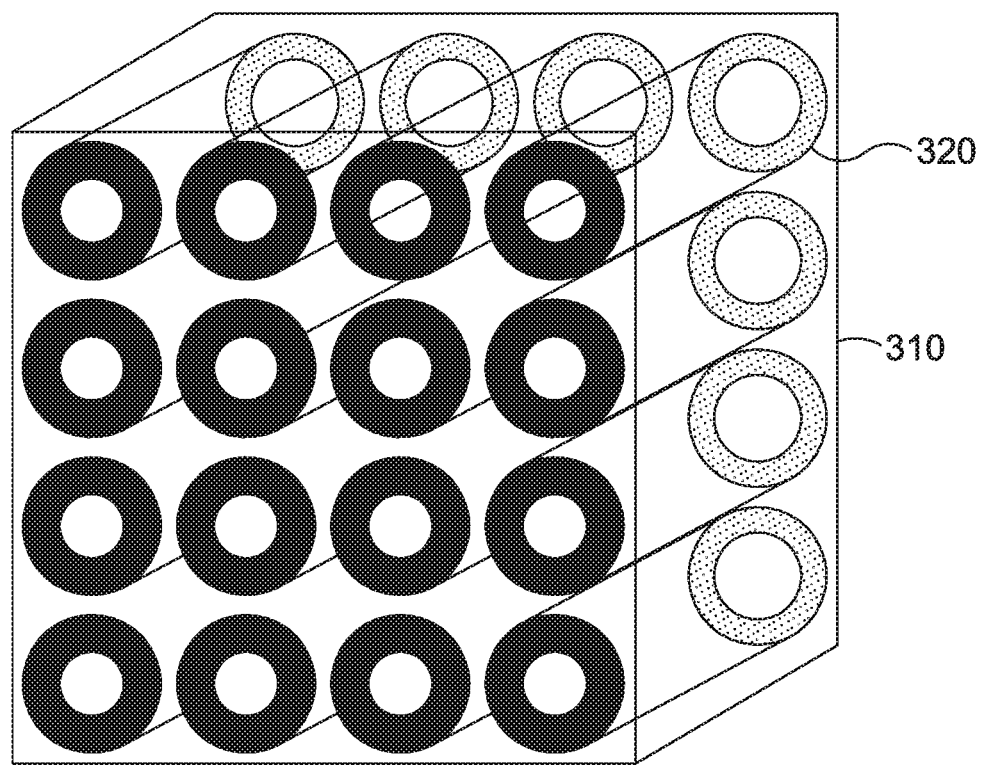
FIG. 4 shows an example of a configuration corresponding to a Napoleon configuration of radial flow adsorbent modules.

Another option for arranging a plurality of modules can be to construct a "Napoleon" structure, as shown in FIG. 4. In the configuration shown in FIG. 4, instead of using thin layer adsorbent beds to form the Napoleon structure, the Napoleon is formed from layers of the radial flow modules 320. The (optional) common volume 310 has a different shape compared with FIG. 3, but otherwise the operation of the Napoleon arrangement in FIG. 4 can be similar to the operation in FIG. 3.

Figure 5:
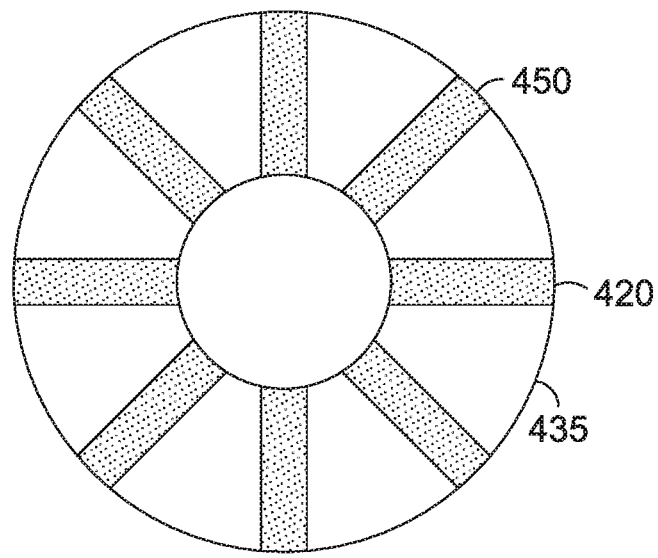
FIG. 5 shows a top view of an annular Napoleon configuration of radial flow adsorbent modules.
Figure 6:
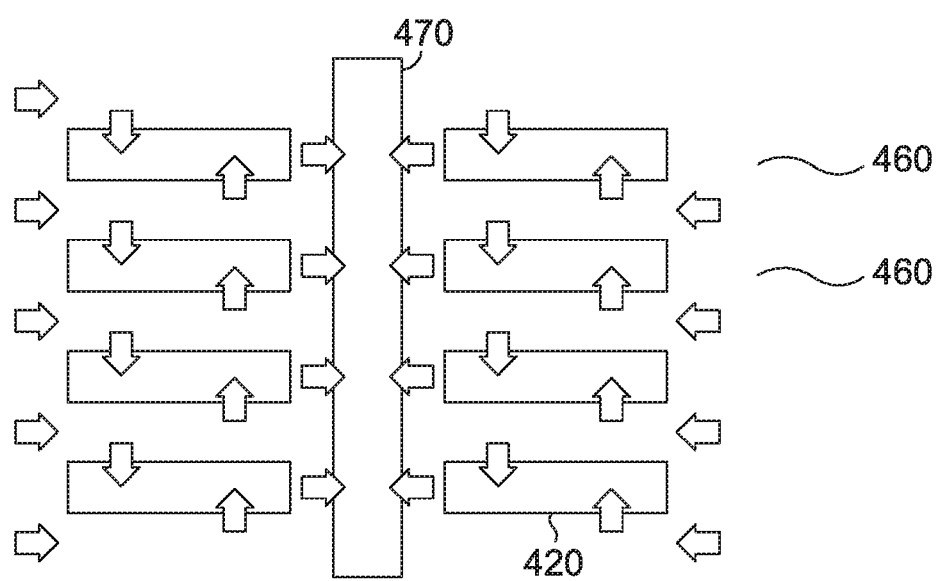
FIG. 6 shows an example of a flow pattern in an annular Napoleon configuration of radial flow adsorbent modules.

Yet another option can be to take advantage of the geometry of the radial flow modules to form a different type of Napoleon structure. FIG. 5 shows a top view of an example of arranging a plurality of the radial flow modules 420 to form an annular shape 450. In the example shown in FIG. 5, the shaded areas correspond to the radial flow module 420, with open intervals 435 between the radial flow modules 420 to allow entry/exit of gas through the adsorbent beds of the radial flow modules 420. The top view in FIG. 5 shows only one annular layer of a potential Napoleon structure. As shown in FIG. 6, any convenient number of annular layers 460 can be stacked, to create a Napoleon structure with a common central annular volume 470 in the center. It is noted that this type of annular Napoleon structure can simplify the piping or manifold required for managing the gas flows. In particular, the central axes of the radial flow modules 420 each exit into the common central annular volume 470 of the Napoleon structure. This can allow input flows to be readily distributed and/or output flows to be ready aggregated into a common pipe.

Figure 7:
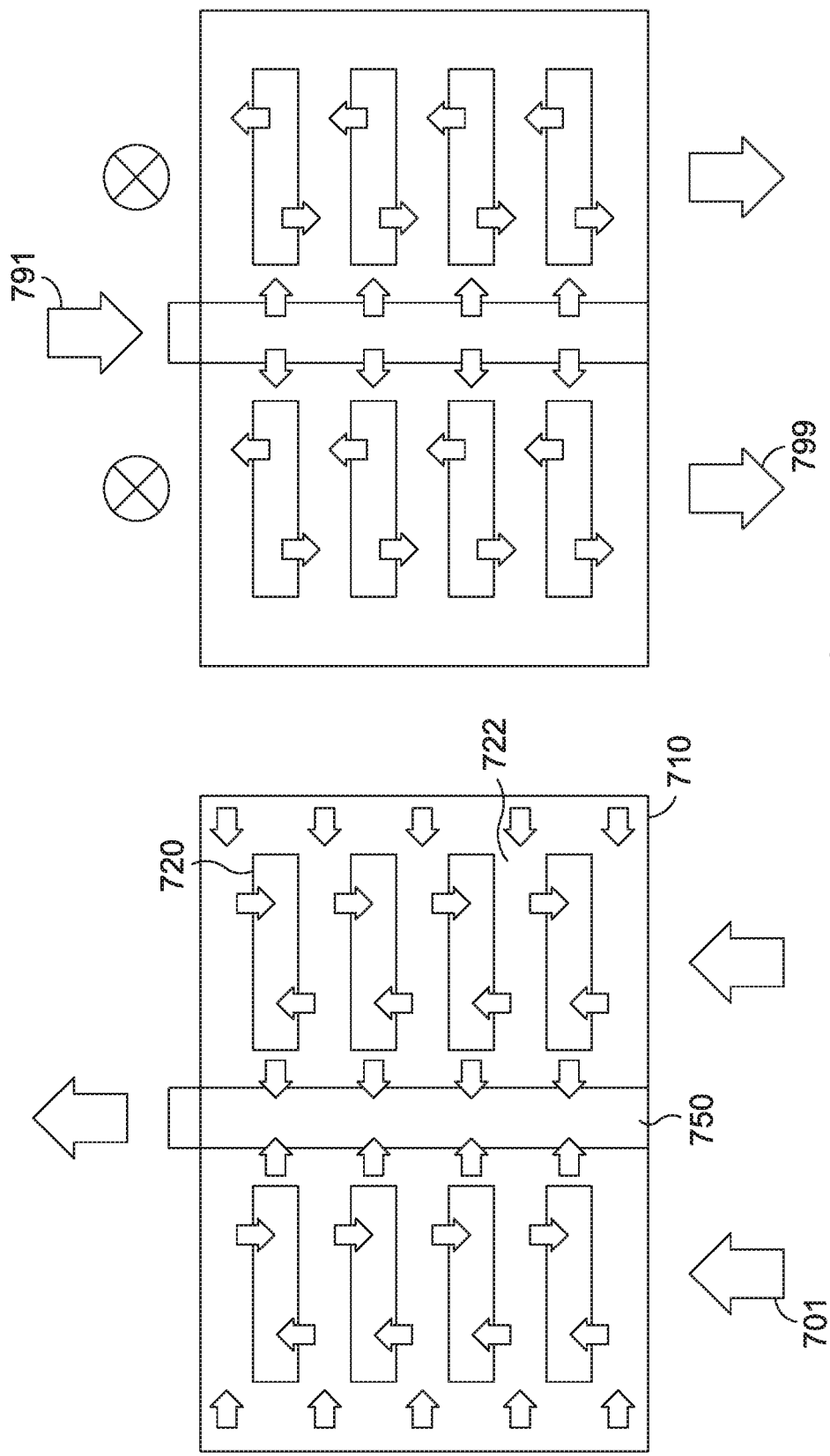
FIG. 7 shows an example of counter-current flow patterns for adsorption and desorption in an annular Napoleon configuration of radial flow adsorbent modules.

The ability to create an annular Napoleon configuration using the radial flow modules can provide additional options for managing the flows during an adsorption/desorption cycle. For example, FIG. 7 shows an example of two potential flow schemes for an annular Napoleon configuration. The flow schemes in FIG. 7 can be used individually, or the flow schemes can be paired to create a counter-current flow scheme for the adsorption and desorption steps of a separation cycle. In order to simplify the description, the flow schemes in FIG. 7 are described for use as counter-current flows, with the left hand portion of FIG. 7 corresponding to adsorption and the right hand portion corresponding to desorption.

In FIG. 7, the left-hand portion can correspond to flows for use during the adsorption phase of a separation cycle. In the left-hand portion of FIG. 7, the dilute $CO_2$-containing feed 701 can be introduced into the space 722 between the radial flow modules 720 in (optional) common volume 710. This can correspond to introducing the feed into a common volume that encloses the Napoleon structure, or any other convenient method of introducing the dilute $CO_2$-containing feed to space around the radial flow modules can be used. The feed can be provided with sufficient pressure to allow the feed to pass through the adsorbent beds of the radial flow modules 720 to enter the central volumes of the radial flow modules. As the feed passes through the adsorbent beds, $CO_2$ is adsorbed. The resulting $CO_2$-depleted feed can then exit the central volumes of the radial flow modules 720 to pass into the common central annular volume 750 of the Napoleon structure. The gas flow into the common central annular volume 750 can then be carried away to any convenient process and/or purged into the atmosphere.

At the end of the adsorption cycle, the flows can be changed to create a $CO_2$-enriched purge stream 799 by desorption of $CO_2$ from the adsorbent beds. The right-hand portion of FIG. 7 shows a counter current flow scheme for creating the $CO_2$-enriched purge stream. In the right-hand portion of FIG. 7, the purge gas 791 can be introduced into the common central annular volume of the Napoleon structure. The purge gas can then enter the radial flow modules via the central axis of each module. $CO_2$ desorbed from the adsorbent can be incorporated into the purge gas, which then exits into the common volume surrounding the Napoleon.

Figure 10:
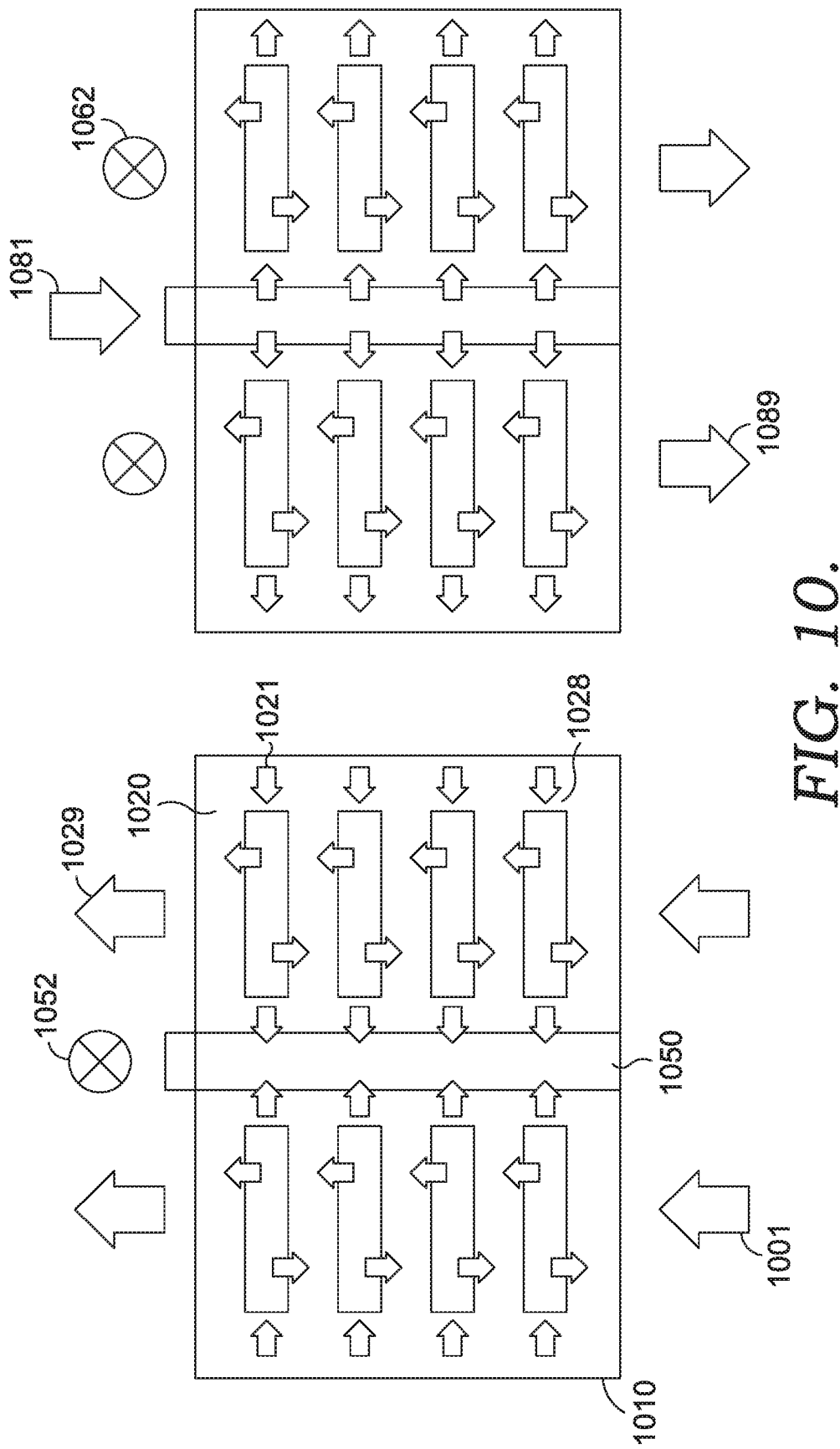
FIG. 10 shows another example of a flow pattern in an annular Napoleon configuration of radial flow adsorbent modules.

FIG. 10 shows another example of a flow scheme for operating a Napoleon configuration of the radial flow adsorbent modules. FIG. 10 uses a Napoleon configuration of radial flow adsorbent modules that is in some ways similar to FIG. 7, but with different connectivity between the modules and external pipes and valving. In FIG. 10, an input flow 1001 can be introduced into common volume 1010 during an adsorption step. In the aspect shown in FIG. 10, the flow paths in common volume 1010 can be configured so that input flow 1001 is substantially directed into the central volumes 1028 of radial flow modules 1020. During adsorption, valve 1052 can be closed, so that feed introduced into central volumes 1028 will exit radially from the radial flow modules 1020. It is noted central volume 1050 can receive an initial portion of the flow until sufficient pressure builds up in central volume 1050 to cause substantially all of the flow to exit radially from radial flow modules 1020. After exiting radially from the radial flow modules 1020, the flow can pass out of the common volume 1010 as exit flow 1029.

During a desorption step, valve 1052 can be opened, so that a purge flow 1081 can pass into central volume 1050. One or more valves 1062 can be closed, so that the purge flow 1081 cannot leave the central volume 1050 along the same path as exit$_{22}$ flow 1029. Instead, purge flow 1081 can pass into the central volumes 1022 of the radial flow modules 1020, and the purge gas (including desorbed $CO_2$) can exit as $CO_2$-enriched stream 1089.

Figure 8:
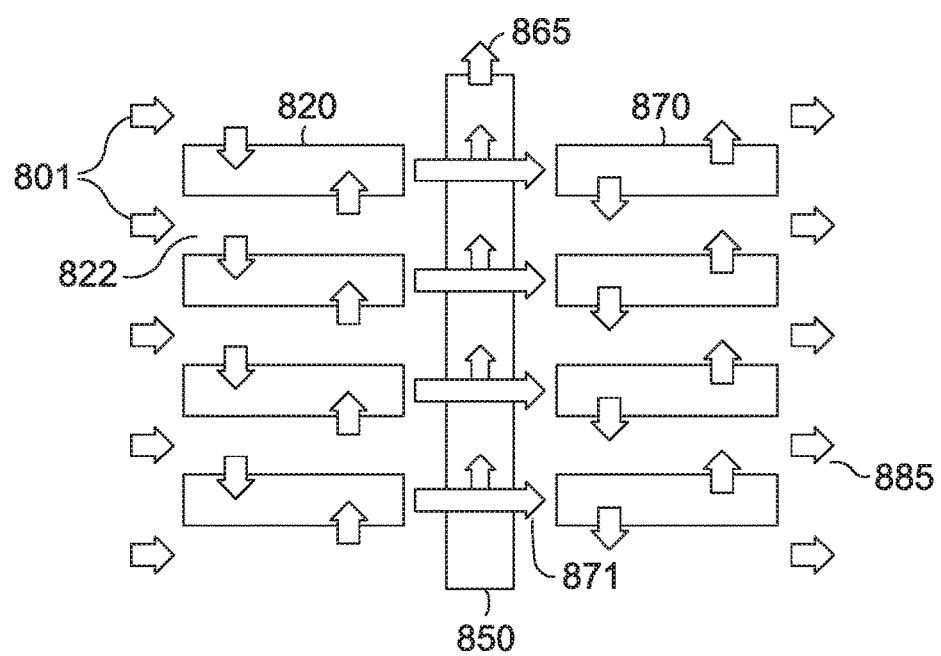
FIG. 8 shows another example of a flow pattern in an annular Napoleon configuration of radial flow adsorbent modules.

FIG. 8 shows yet another example of a flow scheme for operating a Napoleon configuration of the radial flow adsorbent modules. In the configuration shown in FIG. 8, a first group of modules 820 are operated in an adsorption mode. A dilute $CO_2$-containing feed 801 can be introduced into the space 822 around the modules 820. $CO_2$ can be adsorbed by the adsorbent in modules 820. This results in formation of a $CO_2$-depleted feed. Due to the heat generated during adsorption, the $CO_2$-depleted feed can also be at a higher temperature. A portion of this higher temperature, $CO_2$-depleted feed can be passed out of the contactor via the common central annular volume 850. A remaining portion of the higher temperature, $CO_2$-depleted feed can be used as a purge gas for desorption of $CO_2$ from a second group of modules 870.

By using a smaller volume of gas relative to the amount of feed 801, a $CO_2$-enriched product 885 can be produced as the remaining portion of the purge gas passes through second group of modules 870.

Simulated Moving Bed Configurations

The flow schemes shown in FIG. 7, FIG. 8 and FIG. 10 are examples of flow schemes that can be implemented as a simulated moving bed. When operating an adsorbent as a simulated moving bed, the adsorbent can be exposed to a series of different flows, with the entry location for each flow rotating or moving by one position (or another fixed number of positions) after each time interval.

As another example of a potential simulated moving bed implementation, displacement desorption can be used for separation of $CO_2$ from air. This can reduce or minimize the need to perform temperature swing adsorption and/or pressure swing adsorption. The adsorbent can correspond to, for example, a sorbent based on quaternary ammonium sites incorporated into a polymer and formed into particles for fixed bed use. The input feed can correspond to air, which typically has a $CO_2$ concentration of roughly 400 vppm. The sorbent can be effective for adsorption of roughly 60% of the $CO_2$ from the air. This adsorbed $CO_2$ can then be desorbed using a purge stream corresponding to humidified air. This can achieve a $CO_2$ concentration in the purge stream of roughly 1000 vppm. The $CO_2$-enriched purge stream can be used, for example, as a feed for formation of a further $CO_2$-enrichment process or as a $CO_2$ source stream for growth of algae or other biomass.

The relative flows of air during the adsorption and purge steps can be in a ratio of 2.5 volumes of input air to 1.0 volumes of enriched air. Based on this ratio, a convenient configuration can be to have 5 adsorption beds for every 2 displacement beds. These beds could be arranged in a Simulated Moving Bed arrangement, with input air divided equally among 5 beds (or possibly 10 beds) and displacement (humidified) air divided equally among 2 beds (or possibly 4 beds). Valving would progress stepwise to "move" each bed through 5 capture steps followed by 2 displacement steps, with a complete cycle requiring 7 steps. Total inlet flow could be, for example, roughly 100 m³ per second, with the enriched air displacement flow corresponding to roughly 40 m³ per second. Each bed, whether capture or displacement, could have a flow of roughly 20 m³ per second. For such a flow, the adsorbent structure within a radial flow module can correspond to layered beds of adsorbent based on pressure drop considerations.

Examples of Adsorbent Structures

In various aspects, the adsorbent bed sections can correspond to any type of structure, either rigid or non-rigid, that includes or incorporates an adsorbent suitable for adsorption of a gas component during a swing adsorption process. This can include conventional contactor adsorbent structures, such as parallel plate contactors, adsorbent monoliths, and other conventional structures. This can also include non-rigid structures, such as flexible, curtain-like, and/or fabric-like adsorbents. Still other adsorbent structures can correspond to beds of adsorbent particles, either in a conventional adsorbent bed configuration or in a non-traditional configuration, such as use of bed of adsorbent particles under trickle flow conditions.

An example of a suitable contactor can correspond to a parallel channel contactor in which the parallel channels are formed from laminated sheets containing adsorbent material. Laminates, laminates of sheets, or laminates of corrugated sheets can be used in pressure and/or temperature swing adsorption processes. Laminates of sheets are known in the art and are disclosed in U.S. Patent Application Publication US2006/0169142 A1 and U.S. Pat. No. 7,094,275. When the adsorbent is coated onto a geometric structure or components of a geometric structure that are laminated together, the adsorbent can be applied using any suitable liquid phase coating techniques. Non-limiting examples of liquid phase coating techniques that can be used in the practice of the present disclosure include slurry coating, dip coating, slip coating, spin coating, hydrothermal film formation and hydrothermal growth. When the geometric structure is formed from a laminate, the laminate can be formed from any material to which the adsorbent of the present disclosure can be coated. The coating can be done before or after the material is laminated. In all these cases, the adsorbent is coated onto a material that is used for the geometric shape of the contactor. Non-limiting examples of such materials include glass fibers, milled glass fiber, glass fiber cloth, fiber glass, fiber glass scrim, ceramic fibers, metallic woven wire mesh, expanded metal, embossed metal, surface-treated materials, including surface-treated metals, metal foil, metal mesh, carbon-fiber, cellulosic materials, polymeric materials, hollow fibers, metal foils, heat exchange surfaces, and combinations of these materials. Coated supports typically have two major opposing surfaces, and one or both of these surfaces can be coated with the adsorbent material. When the coated support is comprised of hollow fibers, the coating extends around the circumference of the fiber. Further support sheets may be individual, presized sheets, or they may be made of a continuous sheet of material. The thickness of the substrate, plus applied adsorbent or other materials (such as desiccant, catalyst, etc.), typically ranges from about 10 micrometers to about 2000 micrometers, more typically from about 150 micrometers to about 300 micrometers. Other examples of suitable structures can include the triply-periodic minimal surface area contactors, as described in U.S. Pat. No. 9,440,216.

In various aspects, the radial flow adsorbent modules can be beneficial for separation of $CO_2$ from a dilute feed stream. The dilute feed stream can have a $CO_2$ concentration of 5000 vppm or less, or 1000 vppm or less, or 400 vppm or less, such as 100 vppm to 5000 vppm, or 100 vppm to 1000 vppm. The dilute stream can be delivered to the adsorbent structure at a temperature that is generally between 40° C. and 90° C. The pressure of the stream can be relatively low, such as 2 bar-a or less.

Various types of adsorbents can potentially be used with a radial flow adsorbent module, such as the radial flow adsorbent module configuration shown in FIG. 1. For example, adsorbents which include amine functional groups can be suitable for $CO_2$ adsorption. In some aspects, the adsorbent can correspond to an amine-appended metal-organic-framework (MOF) adsorbent. MOF adsorbents can be suitable for use in temperature swing adsorption methods. Based on the step-change nature of the $CO_2$ adsorption on a MOF adsorbent, variations in temperature can be used to switch between adsorption and desorption. Examples of MOF adsorbents are described in an article by McDonald et al. published in Nature, vol. 519, pages 303-308 (2015).

In other aspects, non-MOF adsorbents can be used. Non-MOF adsorbents, which typically exhibit Langmuir-type adsorption curves, can include amine functionalized or amine double-functionalized adsorbents, such functionalized silica gel adsorbents. Other examples of suitable adsorbents can correspond to ion exchange resin type materials.

Swing Adsorption Processes

Swing adsorption processes can have an adsorption step in which a feed mixture (typically in the gas phase) is flowed over an adsorbent that can preferentially adsorb a more readily adsorbed component relative to a less readily adsorbed component. A component may be more readily adsorbed because of kinetic or equilibrium properties of the adsorbent. The adsorbent is typically contained in a contactor that is part of the swing adsorption unit. In some aspects, a plurality of contactors can be used as part of a swing adsorption system. This can allow adsorption and desorption to be performed as a continuous process, with one or more contactors being used for adsorption while one or more additional contactors are used for desorption. As contactors approach a desired and/or maximum loading during adsorption and/or approach a desired and/or complete desorption under the desorption conditions, the flows to the contactors can be switched between adsorption and desorption. It is noted that after the desorption step, the adsorbent may retain a substantial loading of the gas component.

When separating $CO_2$ from a dilute feed, the loading of the adsorbent during the adsorption/desorption cycle can be lower than the loading for a conventional separation. In various aspects, the loading of the adsorbent with the adsorbed gas component at the end of the desorption step can be 0.01 mol/kg or more, or 0.05 mol/kg or more, or 0.1 mol/kg or more, or 0.3 mol/kg or more. For example, the loading can be 0.01 mol/kg to 1.0 mol/kg, or 0.1 mol/kg to 1.0 mol/kg, or 0.01 mol/kg to 0.5 mol/kg. Additionally or alternately, the loading at the end of the desorption step can be characterized relative to the loading at the end of the prior adsorption step. The adsorbent loading at the end of the desorption step can be 0.1% or more of the adsorbent loading at the end of the prior adsorption step, or 1% or more, or 5% or more, or 10% or more, or 20% or more, or 30% or more. Additionally or alternately, the adsorbent loading at the end of the desorption step can be 70% or less of the loading at the end of the prior desorption step, or 50% or less, or 30% or less, or 10% or less. For example, the adsorbent loading at the end of the desorption step can be 0.1% to 70% of the loading at the end of the prior adsorption step, or 1.0% to 70%, or 0.1% to 30%, or 1.0% to 30%.

The method of adsorbent regeneration designates the type of swing adsorption process. For separation of dilute feeds, temperature swing adsorption (TSA) and displacement desorption (DD) processes can be used. Although pressure swing adsorption (PSA) processes are also generally known for separation of gas phase components, due to the low concentration of $CO_2$ in a dilute feed, pressure swing processes may have lower effectiveness.

Temperature Swing Adsorption

Temperature swing adsorption (TSA) processes can employ an adsorbent that is repeatedly cycled through at least two steps—an adsorption step and a thermally assisted regeneration step. TSA processes rely on the fact that gases under pressure tend to be adsorbed within the pore structure of the microporous adsorbent materials. When the temperature of the adsorbent is increased, the adsorbed gas is released, or desorbed. By cyclically swinging the temperature of adsorbent beds, TSA processes can be used to separate gases in a mixture when used with an adsorbent that is selective for one or more of the components in a gas mixture.

Regeneration of the adsorbent can be achieved by heating the adsorbent to an effective temperature to desorb target components from the adsorbent. The adsorbent can then be cooled so that another adsorption step can be completed. Such cooling may be supplied by a cooling fluid either directly or indirectly. The temperature swing adsorption process can be conducted with rapid cycles, in which case they are referred to as rapid cycle temperature swing adsorption (RCTSA). A rapid cycle thermal swing adsorption process is defined as one in which the cycle time between successive adsorption steps is less than about 10 minutes, preferably less than about 2 minutes, for example less than about 1 minute. RC-TSA processes can be used to obtain very high product recoveries in the excess of 90 vol %, for example greater than 95 vol % or, in some cases, greater than 98 vol %. The term "adsorption" as used herein includes physisorption, chemisorption, and condensation onto a solid support, absorption into a solid supported liquid, chemisorption into a solid supported liquid, and combinations thereof.

It is noted that a TSA cycle can also typically include a change in the temperature of the adsorbent from the temperature for the adsorption step to the temperature for the desorption step. The adsorption step can be defined based on the time when the gas flow is started for the input gas containing the component for adsorption and when the gas flow is stopped. The desorption step can be defined based on the time when gas being desorbed from the adsorbent is collected to the time collection is stopped. Any time in the cycle outside of those steps can be used for additional adjustment of the adsorbent temperature. A potential advantage of a TSA separation can be that the process can be performed at a convenient pressure, or with a small amount of variation around a convenient pressure. For example, a goal of a TSA separation can be to develop a substantially pure stream of a gas component that is adsorbed and then desorbed. In this type of aspect, a convenient pressure for the desorption step can be a temperature of about 1 bar (0.1 MPa) or less. Attempting to desorb a stream at greater than about 0.1 MPa can require substantial additional temperature increase for desorption. Additionally, ambient pressure can be a convenient pressure for the adsorption step as well, as many streams containing a gas component for adsorption can correspond to "waste" or flue gas streams that may be at low pressure. In some aspects, the pressure difference between the adsorption and desorption steps can be 1 MPa or less, or 0.2 MPa or less, or 0.1 MPa or less, or 0.05 MPa or less, or 0.01 MPa or less.

A variety of types of solid adsorbents are available for separation of components from a gas flow using temperature swing adsorption (TSA). During a conventional TSA process, at least one component in a gas flow can be preferentially adsorbed by the solid adsorbent, resulting in a stream with a reduced concentration of the adsorbed component. The adsorbed component can then be desorbed and/or displaced from the solid adsorbent, optionally to form a stream having an increased concentration of the adsorbed component.

One of the ongoing challenges with swing adsorption processes is balancing between the desire to increase the working capacity of the adsorbent and the desire to reduce the cycle time. For an idealized process, the working capacity of an adsorbent can be increased by increasing the severity of the difference between the conditions during adsorption and desorption of a target component that is adsorbed out of a gas flow. This can correspond to increasing the difference in pressure between adsorption and desorption (typically for PSA), increasing the difference in temperature between adsorption and desorption (typically for TSA), or a combination thereof.

In practical application, the amount of pressure and/or temperature difference between adsorption and desorption can be limited by a desire to improve total cycle time. Increasing the differential in pressure and/or temperature between adsorption and desorption can cause a corresponding increase in the time required for transitioning between the adsorption and desorption portions of a cycle. This can include one or both of the transition from adsorption to desorption or the transition from desorption to adsorption.

A further complication in swing adsorption processes can be related to achieving full working capacity and/or achieving full restoration of the adsorbent monolith to a desired state prior to the next adsorption step. Equilibrium adsorption isotherms can describe the potential working capacity that may be achieved during a full swing adsorption cycle. However, achieving a desired desorption condition does not guarantee that equilibrium is reached at that condition. For example, in temperature swing adsorption, it can be desirable to reduce or minimize the desorption temperature so long as the temperature still achieves a desired amount of desorption. This can often correspond to a temperature of less than about 200° C. At such temperatures, desorption to equilibrium values may take a long time relative to a cycle time, as random fluctuations within the temperature ensemble state may be needed to achieve desorption of individual adsorbed compounds. It is noted that it may be preferable to operate a swing adsorption cycle without reaching the final equilibrium value for the adsorption step and/or the desorption step. While such operation may reduce the actual working capacity of the adsorbent relative to the potential working capacity, ending the adsorption step and/or desorption step prior to reaching equilibrium can substantially reduce the cycle time in some instances.

Displacement Adsorption/Desorption Processes

Displacement Adsorption/Desorption ("DD") processes employ gas-solids contactors in which the sorbent is alternately exposed to the feed gas and to steam wherein the gas and steam are essentially at the same temperature. In the steaming step the carbon dioxide adsorbed from the gas is released from the sorbent by a combination of concentration swing and desorptive displacement, thereby regenerating the sorbent for re-use. No external application or removal of heat is used, and the process operates at essentially constant pressure. The process is notably identifiable and distinguishable and beneficial as compared to pressure swing or partial pressure swing separation in that during the adsorption of $CO_2$ the bed temperature decreases below the average bed temperature as determined over the entire cycle and during $CO_2$ displacement/desorption the bed temperature increases above the average. The process is further distinguished and beneficial as compared to thermal swing separation in that no external heat is applied and the desorption gas, steam, is essentially isothermal with the feed gas. The gas-solids contactors may use moving solid sorbents, or solid sorbents contained in packed beds or in parallel-channel beds (monoliths). The packed bed or monoliths can be rotating or stationary. To permit continuous flow of inlet and outlet streams, multiple beds can be combined with appropriate valving to switch individual beds between adsorption and desorption. Such multiple bed arrangements can be operated to achieve counter-current staging. The water and energy from the regeneration steam can be recaptured after use and recycled back into the process.

Although a classic displacement desorption process can be performed in an adiabatic manner, in some aspects displacement desorption can be combined with temperature swing adsorption. In such aspects, both a temperature swing and steam can be used during desorption to remove $CO_2$ from the adsorbent.

Some DD regeneration processes use contact with steam to remove the adsorbed gas from the sorbent. The regeneration mechanism can be by a combination of concentration swing and desorptive displacement of the adsorbed gas with steam. The disclosure can further relate to a method to recycle the steam and recover its energy through a multi-stage condenser/heat exchangers system. The advantage of this option is that it increases system efficiency.

DD processes can be used for removal of $CO_2$ from a combustion flue gas or natural gas stream or other streams. An advantage is that the adsorbent can be rapidly regenerated essentially isothermally with steam and discharge a moist $CO_2$ stream wherein the $CO_2$ concentration is higher than that in the original feed gas. Another advantage of the sorbent is that it can be used in an adiabatic reactor design. The sorbent adsorbs water during regeneration with steam and then desorbs water during $CO_2$ adsorption so that the net reactions are exothermic during steaming and endothermic during adsorption. In this way the system does not require external thermal management on the adsorber and regenerator beds. This modest temperature swing is also important because it thermally assists both adsorption and desorption, again without the addition of external thermal management.

High process efficiency can be important in order for $CO_2$ capture to be economical. The regeneration system can be designed to recycle the steam and recover its energy.

The process can be carried out in a cyclic adsorption/regeneration cycle and can include various intermediate purges and stream recycles. Such a process can be performed with co-directional flow of the feed gas and regeneration steam, but can be preferably performed with counter-current feed adsorption/steam regeneration steam flows.

The process can include the steps of passing a gas stream comprising $CO_2$ over a sorbent to adsorb the $CO_2$ to the sorbent, and then recovering the $CO_2$ by desorbing the $CO_2$ from the sorbent. As noted above, and discussed in more detail below, the adsorption/desorption process can be based on concentration swing and desorptive displacement. Concentration swing adsorption (CSA) processes including the adsorption and desorption steps are governed by change in fugacity of the adsorbate, in this case, $CO_2$, in the gas stream, in comparison to the adsorbent. The adsorbate, in this case $CO_2$, is adsorbed when its fugacity is high in the gas stream and low in the adsorbent. Conversely, it is desorbed when its fugacity is reduced in the gas stream relative to the amount in the adsorbent. By way of example, an adsorbent having a high level of $CO_2$ might still adsorb additional $CO_2$ when the gas stream has a relatively higher fugacity of $CO_2$ versus the adsorbent. And an adsorbent having a low level of $CO_2$ can adsorb $CO_2$ when the gas stream has a low fugacity of $CO_2$ so long as the relative fugacity of $CO_2$ in the sorbent is still lower than the $CO_2$ in the gas stream. One of ordinary skill in the art would also recognize that "relative fugacity" does not imply relative concentration in the absolute value sense, i.e. does not mean that a 2% adsorbed $CO_2$ content is necessarily larger than a 1% $CO_2$ gas level, because the ability of the gas to retain $CO_2$ versus the ability of adsorbent to adsorb additional $CO_2$ will be governed by various equilibrium relationships.

DD processes also include desorbing the $CO_2$ from the sorbent. This step might also be referred to as a regeneration step because the sorbent is regenerated for the next passage of a $CO_2$ gas stream across the sorbent. The desorption of $CO_2$ from the sorbent comprises treating the sorbent with steam. This desorption step can be driven by a one or more forces. One desorption force is concentration swing, as with the adsorption step above. The partial pressure of $CO_2$ in the incoming steam is nearly zero, and thus the adsorbed $CO_2$ can shift to the steam phase. The second desorption force is desorption by displacement. The water molecules in the steam can adsorb onto the sorbent and displace the $CO_2$ from the sorbent.

As an optional step, the processes, methods and systems of the disclosure can also include one or more purging step, in which a non-adsorbent gas, i.e. not steam or a $CO_2$ feed stream, can be passed across the sorbent. The gas can be any gas known to one or ordinary skill in the art, such as for example an inert gas or air. In an embodiment, the purge gas can be a nitrogen stream, an air stream, or a dry air stream. Alternatively the purge gas can be a $CO_2$ feed gas or steam that is recycled into a process step. The purge step can be conducted at any time. For example, prior to the passing of the $CO_2$ feed stream across the sorbent, a purge gas can be passed to remove residual and adsorbed water vapor. This purge gas can be run back into the regeneration side in order for the water vapor to be readsorbed onto the regeneration side. The purging step can also occur between the adsorption step or steps, and the desorption or regeneration step or steps. The purge gas can be non-reactive, but can still optionally remove adsorbed $CO_2$ from a sorbent based on concentration swing. Thus, in an embodiment, the purging step can be conducted after adsorption steps, and can be conducted to remove residual gas prior to desorption, which can be optionally recycled into the process. Moreover, the purge step can also be optionally diverted into two streams: 1) an initial purge stream to remove the first gas, and 2) a separate purge stream that can contain the initial purified or desorbed $CO_2$, which could be optionally captured as part of the final product stream. Furthermore, in an embodiment, a purging step can be conducted after the desorption or regeneration step(s) is complete, thereby to optionally removing residual water and/or steam which can be recycled back into the process. Each purging step can thereby reduce an excess gas stream which can, for example lead to a more efficient process or produce a more $CO_2$ enriched product stream because a final product stream is not diluted by a preceding gas source. By way of specific example, a purging step conducted after the initial adsorption can remove residual, dilute $CO_2$ feed stream, leading to a more concentrated $CO_2$ product stream. The resulting gas stream from the purging step can be recycled into the system, or split into a recycle and a product stream.

Example: $CO_2$ Separation from Dilute Feed for Use in Biomass Growth

Figure 9:
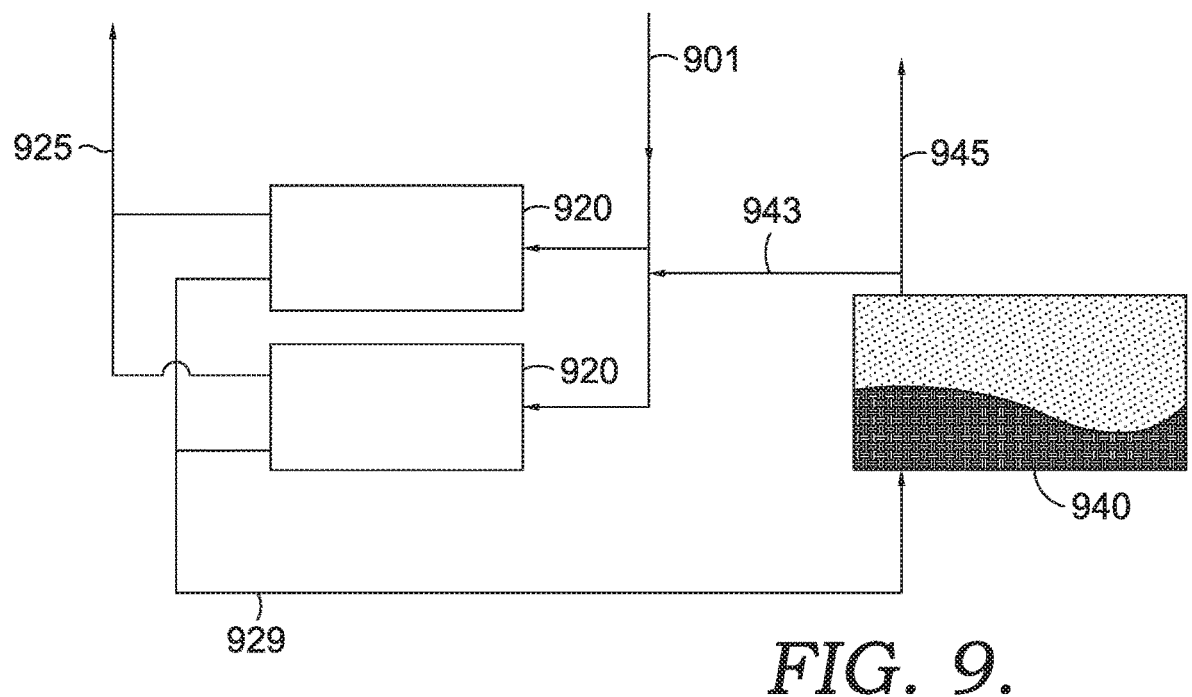
FIG. 9 shows an example of separating $CO_2$ from a dilute feed to provide an enriched $CO_2$ stream for use in a bioreactor.

FIG. 9 shows an example of integration of a biomass growth system with a system for forming an enriched $CO_2$-containing stream from a dilute feed. In FIG. 9, a feed 901 from an external source is introduced into one or more adsorbent bed contactors 920. The external source can correspond to any convenient type of dilute $CO_2$-containing stream. Examples of external sources can include air or flue gas from a combustion source that results in a dilute $CO_2$ feed. The adsorbent bed contactors can be used to form a $CO_2$-depleted stream 925 and an enriched $CO_2$ stream 929. The enriched $CO_2$ stream 929 can then be passed into an algae bio-reactor 940 or another biomass growth process. The resulting $CO_2$-lean stream 943 from the algae bio-reactor 940 can optionally be used as the purge stream that is passed into adsorbent bed contactors 920 to form the enriched $CO_2$ stream 929.

Additional Embodiments

Embodiment 1. A method for performing a separation on a dilute $CO_2$-containing feed, comprising: passing a feed comprising a $CO_2$ content of 5000 vppm or less and a first $H_2O$ content into a radial flow adsorbent bed module comprising alternating adsorbent bed sections and heat transfer sections to form adsorbed $CO_2$ and a $CO_2$-depleted stream, the adsorbent beds comprising a bed inner surface that faces a central axis of the radial flow adsorbent bed module and a bed outer surface at a larger radial distance from the central axis than the bed inner surface, the heat transfer sections comprising a transfer section inner surface that faces a central axis of the radial flow adsorbent bed module and a transfer section outer surface at a larger radial distance from the central axis than the interior surface, the bed inner surfaces and the transfer section inner surfaces defining a central volume, the adsorbent beds comprising one or more adsorbents having amine functional groups, the feed being passed through the adsorbent beds under adsorption conditions at a first temperature and substantially along a radial direction of the radial flow adsorbent bed module; desorbing at least a portion of the adsorbed $CO_2$ in the presence of a purge gas under desorption conditions to form a $CO_2$-enriched purge gas comprising a $CO_2$ content greater than the $CO_2$ content of the feed, the desorption conditions comprising at least one of a desorption temperature higher than the first temperature and an $H_2O$ content in the purge gas that is greater than the first $H_2O$ content, the purge gas being passed through the adsorbent beds substantially along the radial direction of the radial flow adsorbent bed module; and passing, during the adsorbing and the desorbing, one or more heat transfer fluids through the heat transfer sections substantially along an axial direction of the radial flow adsorbent bed module, the one or more heat transfer fluids optionally comprising steam.

Embodiment 2. The method of Embodiment 1, wherein the feed is passed into the radial flow adsorbent bed through the outer surfaces of the adsorbent bed sections, or wherein the purge gas is passed into the radial flow adsorbent bed through the outer surfaces of the adsorbent bed sections, or a combination thereof.

Embodiment 3. The method of any of the above embodiments, wherein the feed is passed into the central volume of the radial flow adsorbent bed, or wherein the purge gas is passed into the central volume of the radial flow adsorbent bed, or a combination thereof.

Embodiment 4. The method of any of the above embodiments, wherein passing the feed into a radial flow adsorbent bed module comprises passing the feed into a plurality of radial flow adsorbent bed modules arranged in a Napoleon configuration; or wherein passing the feed into a radial flow adsorbent bed module comprises passing the feed into a plurality of radial flow adsorbent bed modules arranged in an annular Napoleon configuration comprising a common central annular volume.

Embodiment 5. The method of any of the above embodiments, wherein the desorption conditions comprise displacement desorption conditions, the $H_2O$ content in the purge gas being greater than the first $H_2O$ content, and wherein a difference between an average adsorbent bed temperature at the end of the adsorption step and an average adsorbent bed temperature at the end of the desorption step is 5° C. or less.

Embodiment 6. The method of any of the above embodiments, wherein the desorption conditions comprise displacement desorption conditions, the $H_2O$ content in the purge gas being greater than the first $H_2O$ content, and wherein a) a difference between an average adsorbent bed temperature at the beginning of the adsorption step and an average adsorbent bed temperature at the end of the adsorption step is 5° C. or less, b) a difference between an average adsorbent bed temperature at the beginning of the adsorption step and an average adsorbent bed temperature at the end of the adsorption step is 5° C. or less, or c) a combination of a) and b).

Embodiment 7. The method of any of Embodiments 1-5, wherein the adsorption conditions comprise temperature swing adsorption conditions, and wherein i) a difference between an average adsorbent bed temperature at a beginning of the adsorption step and an average adsorbent bed temperature at the end of the adsorption step is 10° C. or less, ii) a difference between an average adsorbent bed temperature at a beginning of the desorption step and an average adsorbent bed temperature at the end of the desorption step is 10° C. or less, or iii) a combination of i) and ii).

Embodiment 8. The method of any of the above embodiments, A) wherein the one or more adsorbents comprising amine functional groups comprise metal organic framework adsorbents; B) wherein the one or more adsorbents comprising amine functional groups comprise amine functionalized adsorbents, double amine functionalized adsorbents, or a combination thereof; or C) a combination of A) and B).

Embodiment 9. The method of any of the above embodiments, further comprising introducing the $CO_2$-enriched purge gas into a bio-reactor for biomass growth.

Embodiment 10. The method of any of the above embodiments, wherein the passing the feed through the adsorbent beds under adsorption conditions and passing the purge gas through the adsorbent beds under desorption conditions comprise simulated moving bed conditions.

Embodiment 11. The method of any of the above embodiments, wherein the $CO_2$-depleted gas comprises a temperature greater than the first temperature, and wherein at least a portion of the $CO_2$-depleted gas is used as the purge gas.

Embodiment 12. A system for separating $CO_2$ from a dilute feed, comprising: a plurality of radial flow adsorbent bed modules arranged in a Napoleon configuration, a radial flow adsorbent bed module comprising: a plurality of adsorbent bed sections, the adsorbent bed sections comprising a bed inner surface that faces a central axis of the radial flow adsorbent bed module and a bed outer surface at a larger radial distance from the central axis than the bed inner surface, the adsorbent beds comprising one or more adsorbents having amine functional groups, and a plurality of heat transfer sections, the plurality of heat transfer sections alternating with the plurality of adsorbent bed sections in the radial flow adsorbent bed module, the heat transfer sections comprising one or more heat transfer fluid conduits oriented substantially along an axial direction of the radial flow adsorbent bed module, the heat transfer sections comprising a transfer section inner surface that faces a central axis of the radial flow adsorbent bed module and a transfer section outer surface at a larger radial distance from the central axis than the interior surface, wherein the bed inner surfaces and the transfer section inner surfaces define a central volume, and wherein the radial flow adsorbent bed module comprises a substantially annular shape.

Embodiment 13. The system of Embodiment 12, wherein the plurality of radial flow adsorbent bed modules are arranged in an annular Napoleon configuration comprising a common central annular volume.

Embodiment 14. The system of Embodiment 12 or 13, A) wherein the one or more adsorbents comprising amine functional groups comprise metal organic framework adsorbents; B) wherein the one or more adsorbents comprising amine functional groups comprise amine functionalized adsorbents, double amine functionalized adsorbents, or a combination thereof or C) a combination of A) and B).

Embodiment 15. The method of any of Embodiments 1-11 or the system of any of Embodiments 12-14, wherein the inner surfaces of the adsorbent beds comprise arcuate surfaces, or wherein the outer surfaces of the adsorbent beds comprise arcuate surfaces, or a combination thereof.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A system for separating $CO_2$ from a dilute feed, comprising:
a plurality of radial flow adsorbent bed modules arranged in a Napoleon configuration, the radial flow adsorbent bed module comprising:
a plurality of adsorbent bed sections, the adsorbent bed sections comprising a bed inner surface that faces a central axis of the radial flow adsorbent bed module and a bed outer surface at a larger radial distance from the central axis than the bed inner surface, the adsorbent beds comprising one or more adsorbents having amine functional groups, and
a plurality of heat transfer sections, the plurality of heat transfer sections alternating with the plurality of adsorbent bed sections in the radial flow adsorbent bed module, the heat transfer sections comprising one or more heat transfer fluid conduits oriented substantially along an axial direction of the radial flow adsorbent bed module, the heat transfer sections comprising a transfer section inner surface that faces a central axis of the radial flow adsorbent bed module and a transfer section outer surface at a larger radial distance from the central axis than the interior surface, wherein the bed inner surfaces and the transfer section inner surfaces define an central volume, and wherein the radial flow adsorbent bed module comprises a substantially annular shape.

2. The system of claim 1, wherein the plurality of radial flow adsorbent bed modules are arranged in an annular Napoleon configuration comprising a common central annular volume.

3. The system of claim 1, wherein the one or more adsorbents comprising amine functional groups comprise metal organic framework adsorbents.

4. The system of claim 1, wherein the one or more adsorbents comprising amine functional groups comprise amine functionalized adsorbents, double amine functionalized adsorbents, or a combination thereof.

5. The system of claim 1, wherein the inner surfaces of the adsorbent bed sections comprise arcuate surfaces, or wherein the outer surfaces of the adsorbent bed sections comprise arcuate surfaces, or a combination thereof.

\* \* \* \* \*